Patented Apr. 1, 1947

2,418,237

UNITED STATES PATENT OFFICE 2,418,237

PROCESS FOR PREPARATION OF 2,2-DIALKYL-1,3-PROPANEDIAMINES

Murray Senkus, Terre Haute, Ind., assignor to Commercial Solvents Corporation, Terre Haute, Ind., a corporation of Maryland No Drawing. Application June 12, 1944, Serial No. 540,003

11 Claims. (Cl. 260—583)

My invention relates to a novel process for preparing 2,2-dialkyl-1,3-propane diamines by the catalytic reduction of 2,2-dialkyl-1,3-dinitropropanes.

The reaction involving the reduction of a nitro group to an amino group by various methods has been a matter of common knowledge for some time, and at present numerous commercial processes are in operation which are based principally on this reaction. The most general procedures previously employed for accomplishing this purpose have dealt with the use of the combination of a metal and an acid such as, for example, iron and hydrochloric acid, to provide satisfactory reducing conditions; or molecular hydrogen in the presence of a suitable neutral solvent and a hydrogenation catalyst.

Attempts to reduce, by the usual means, dinitro compounds of the type having the neopentane configuration, that is, a structure in which the nitro groups are on alternate carbon atoms, each of which is alpha to a quaternary carbon atom, have been unsuccessful. For example, when reduction of such compounds was carried out by the usual iron-acid process, not only were yields uneconomically low, but the diamine produced was found to be of such character that the usual convenient steam distillation recovery was impossible as the diamine simply failed to distil with steam.

When the more convenient catalytic reduction was attempted in the usual way with compounds having the configuration described, utilizing a solvent carrier such as methanol for dissolving the dinitro compound and treating the solution with molecular hydrogen in the presence of a catalyst under elevated temperatures and pressures, and under the usual neutral pH conditions, believed to be necessary to avoid injury to the catalyst and corrosion of equipment, no measurable quantities of diamine were formed.

I have now discovered that 1,3-dinitro-2,2-dialkyl propanes of the following structural formula

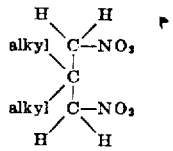

may be reduced to the corresponding diamines in excellent yields by subjecting the 1,1-dinitro-2,2-dialkyl propanes to catalytic reducing conditions in the presence of Raney nickel catalyst in an acid medium in which the acid is present in an amount slightly in excess of the amount required to combine with the quantity of diamine theoretically obtainable. As the acid, I use a saturated fatty acid, such as, formic, acetic, propionic, butyric acids, and the like, which I have found have no harmful effect upon the catalyst employed, or on the reactants. Mineral acids, on the other hand, cannot be used as these react with the catalyst and prevent hydrogenation. Carbonic acid is also unsatisfactory as it does not appear to promote any appreciable amount of hydrogenation and oxalic acid, likewise, is unsatisfactory as it appears to poison the catalyst.

I use an amount of acid slightly in excess of an amount sufficient to combine with all the amine which will be formed, in order to insure acid reaction conditions up to the completion of the reaction. As the amine formed is basic it combines with and neutralizes the acid progressively as it is formed, so that a less than equivalent amount of acid causes the mixture to become basic before all the nitro compound has been converted, resulting in a cessation of the reduction at this point and a consequent lowering in the yield of diamine. An excess of acid, therefore, is necessary, but the excess need not be large. an amount equal to a fraction of a mole being sufficient.

Why the use of the acidic material of the type described should promote effective reduction of compounds of the type described when used in the catalytic hydrogenation process is not understood, but whatever the explanation may be, the results are, that with the saturated fatty acid present, the diamine is formed in good yields, whereas without it, no appreciable quantity of diamine is formed.

The solvent or solvent mixture employed may be any of several materials which are chemically inert towards the catalyst and the components of the reaction mixture at the temperature employed. In general, however, it will be found preferable to dissolve the 1,3-dinitro-2,2-dialkyl propane in a solvent such as a lower aliphatic alcohol such as methanol or ethanol, either anhydrous or diluted with water. In preparing the 2,2-dialkyl-1,3-propane diamine in accordance with the liquid phase catalytic reduction method of my invention, a mixture consisting essentially of the 1,3-dinitro-2,2-dialkyl propane, saturated fatty acid, a solvent such as methanol, and the hydrogenation catalyst is introduced into a suitable hydrogenation apparatus and subjected to a hydrogen pressure of from about 500 to 2000 pounds per square inch at a temperature ranging from about 30° to 75° C. and preferably between 35 and 50° C. When the absorption of hydrogen ceases, the crude mixture is removed from the hydrogenation apparatus and the pure diamine is obtained by filtering the resulting mass, treating the filtrate with a solution of a suitable base such as sodium hydroxide to liberate the free diamine which rises to the top as an oil and is separated. The lower aqueous layer may be extracted with a suitable solvent such as benzene to recover any dissolved diamine which may be present therein, and the resulting benzene extract combined with the original oil layer. The pure 2,2-dialkyl-1,3-propane diamine is then purified by fractionation under reduced pressure.

The following specific examples are given in order to illustrate my invention.

Example I

A mixture of 162 parts of 1,3-dinitro-2,2-dimethyl-propane, 125 parts of acetic acid, 400 parts of 60 per cent methanol, and 10 parts of Raney nickel, was introduced into a hydrogenation apparatus of conventional design, and hydrogen added and maintained at a pressure of approximately 1000 pounds per square inch, with constant agitation, at a temperature of about 40° C. After absorption of hydrogen ceased, the reaction mixture was removed from the hydrogenation apparatus, filtered, and the methanol separated from the resulting filtrate by distillation at atmospheric pressure. Ninety parts of sodium hydroxide was then dissolved in the residue thus obtained, causing a precipitation of a comparatively small quantity of nickel in the form of nickelous hydroxide. This alkaline mixture was next filtered, and 400 parts of a 50 per cent sodium hydroxide solution was added to the filtrate, whereupon the solution separated into two layers, the top layer consisting principally of the crude free diamine. The mixture was then extracted with three 200-part portions of benzene, the extracts combined and distilled through an efficient column at atmospheric pressure to remove the benzene therefrom and the residue then distilled at a pressure of 50 mm. The portion of the product boiling at 77°–78° C., consisted of substantially pure 2,2-dimethyl-1,3-propanediamine, and amounted to 87 parts, corresponding to a conversion of 86 per cent.

Example II

*2-ethyl-2-methyl-1,3-propanediamine*

A mixture of 69 parts of 2-ethyl-2-methyl-1,3-dinitropropane, 400 parts of methanol, 200 parts of water, 50 parts acetic acid and 15 parts of Raney nickel catalyst was hydrogenated in a rocking bomb at 1000 lbs. pressure. The absorption of hydrogen was practically complete in one-half hour at 50° C. The temperature was raised to 80° for three hours to insure completion of the reaction. The reduction mixture was filtered and distilled through a packed column after the addition of 30 parts of concentrated sulfuric acid. The distillate was taken off slowly at 54° until all of the acetic acid had been removed in the form of methyl acetate after which the methanol was removed. A suspension of 45 parts of lime in 200 parts of water was added to the residue and the mixture was agitated for one hour and filtered. Benzene was added to the filtrate and the mixture was distilled through a separator arranged to return benzene to the flask while water was removed. When free from water, the residue was filtered and fractionated through a packed column. The product collected at 76–78° at 20 mm. amounted to 33.1 parts representing a yield of 72.8%. The product had the following properties:

Color—water white
Nitrogen (Kjeldahl) — 23.84% (theoretical 24.11%)
Equivalent weight (by titration)—59.55 (theoretical 58.07)
Specific gravity $\frac{20°}{20°}$—0.8769
Refractive index $n_D{}^{20}$—1.4607

Example III

*2,2-di-n-propyl-1,3-propanediamine*

A mixture of 37 parts of 2,2-di-n-propyl-1,3-dinitropropane, 300 parts of methanol, 150 parts of water, 25 parts of acetic acid and 15 parts of Raney nickel catalyst was hydrogenated at 1000 lbs. pressure in a rocking bomb. The reduction as indicated by hydrogen absorption was complete in 50 minutes at 50° but the temperature was raised to 80° and held for 1½ hrs. The reaction mixture with 100 parts of water used for rinsing out the bomb, was filtered and the cake was washed with a small amount of water. The addition of 15 parts of concentrated sulfuric acid to the filtrate resulted in a voluminous white precipitate. This was removed by filtration, washed with methanol and dried. The crystals, consisting of lustrous white plates, amounted to 35.5 parts. They decomposed at 285° C. and contained 10.76% nitrogen (Theoretical for the sulfate of the diamine is 10.9% nitrogen). The yield of diamine isolated as sulfate was 84.4% in addition to that remaining in solution in approximately 600 parts of 45% methanol solution.

The addition of 100 parts of 3 normal sodium hydroxide solutions to 33 parts of the sulfate resulted in 2 liquid layers. The mixture was extracted with benzene and the benzene extract was fractionated through a packed column. The product, collected at 117–118° (19 mm.) had the following properties:

Color—water white
Equivalent weight (by titration)—80.16 (theoretical 79.09)
Specific Gravity $\frac{20°}{20°}$—0.8768
Refractive index $n_D{}^{20}$—1.4647

This case is a continuation-in-part of my application Serial No. 466,326, filed November 20, 1942.

While the above describes the preferred embodiments of my invention, it will be understood that departures may be made therefrom within the scope of the specification and claims.

What is claimed is:

1. A process for preparing 2,2-dialkyl-1,3-propane diamines which comprises subjecting a 1,3-dinitro-2,2-dialkyl propane to catalytic hydrogenation in the presence of an acid consisting of a saturated lower fatty acid.

2. A process for preparing 2,2-dialkyl-1,3-propane diamines which comprises subjecting a 1,3-dinitro-2,2-dialkyl propane to catalytic hydrogenation at temperatures between 30 and 75° C. in the presence of an acid consisting of a saturated lower fatty acid.

3. A process for preparing 2,2-dialkyl-1,3-propane diamines which comprises subjecting a 1,3-dinitro-2,2-dialkyl propane to catalytic hydrogenation at temperatures between 35 and 50° C. in the presence of an acid consisting of a saturated lower fatty acid.

4. A process for preparing 2,2-dialkyl-1,3-propane diamines which comprises subjecting a 1,3-dinitro-2,2-dialkyl propane to catalytic hydrogenation at elevated temperature and pressure in the presence of an acid consisting of a saturated lower fatty acid.

5. A process for preparing 2,2-dialkyl-1,3-propane diamines which comprises dissolving 1,3-dinitro-2,2-dialkyl propane in a lower aliphatic alcohol, adding a quantity of a saturated lower fatty acid thereto slightly in excess of that required to combine with the quantity of diamine theoretically obtainable, mixing Raney nickel catalyst therewith and passing elemental hydrogen through the mixture at elevated temperature and pressure.

6. A process for preparing 2,2-dialkyl-1,3-propane diamines which comprises dissolving 1,3-dinitro-2,2-dialkyl propane in a lower aliphatic alcohol, adding thereto a quantity of a saturated lower fatty acid slightly in excess of that required to combine with the quantity of diamine theoretically obtainable, mixing Raney nickel catalyst therewith and passing elemental hydrogen through the mixture at temperatures between 35 and 50° C. and a hydrogen pressure between 500 and 2000 pounds per square inch.

7. A process for preparing 2,2-dialkyl-1,3-propane diamines which comprises subjecting a 1,3-dinitro-2,2-dialkyl propane to catalytic hydrogenation in the presence of a quantity of a saturated lower fatty acid in excess of an acid consisting of the amount required to combine with the quantity of diamine theoretically obtainable.

8. A process for preparing 2,2-dialkyl-1,3-propane diamines which comprises subjecting a 1,3-dinitro-2,2-dialkyl propane to catalytic hydrogenation in the presence of an acid consisting of acetic acid.

9. A process for preparing 2,2-dimethyl-1,3-propane diamine which comprises subjecting a 1,3-dinitro-2,2-dimethyl propane to catalytic hydrogenation in the presence of an acid consisting of a saturated lower fatty acid.

10. A process for preparing 2-ethyl-2-methyl-1,3-propanediamine which comprises subjecting a 1,3-dinitro-2-ethyl-2-methyl propane to catalytic hydrogenation in the presence of an acid consisting of a saturated lower fatty acid.

11. A process for preparing 2,2-di-n-propyl-1,3-propanediamine which comprises subjecting a 1,3-dinitro-2,2-di-n-propyl propane to catalytic hydrogenation in the presence of an acid consisting of a saturated lower fatty acid.

MURRAY SENKUS.

REFERENCES CITED

The following references are of record in the file of this patent:

UNITED STATES PATENTS

| Number | Name | Date |
|---|---|---|
| 2,157,391 | Vanderbilt | May 9, 1939 |

FOREIGN PATENTS

| Number | Country | Date |
|---|---|---|
| 571,794 | German | Mar. 15, 1933 |

OTHER REFERENCES

Vanderbilt et al., Ind. & Eng. Chem., vol. 32 (1940), pages 34–36. (Copy in Pat. Off. Lib.)

---

Certificate of Correction

Patent No. 2,418,237.

April 1, 1947.

MURRAY SENKUS

It is hereby certified that error appears in the printed specification of the above numbered patent requiring correction as follows: Column 5, lines 32 and 33, claim 7, strike out the words "an acid consisting of" and insert the same after "quantity of" in line 31, same claim; and that the said Letters Patent should be read with this correction therein that the same may conform to the record of the case in the Patent Office.

Signed and sealed this 5th day of August, A. D. 1947.

[SEAL]

LESLIE FRAZER,
*First Assistant Commissioner of Patents.*

4. A process for preparing 2,2-dialkyl-1,3-propane diamines which comprises subjecting a 1,3-dinitro-2,2-dialkyl propane to catalytic hydrogenation at elevated temperature and pressure in the presence of an acid consisting of a saturated lower fatty acid.

5. A process for preparing 2,2-dialkyl-1,3-propane diamines which comprises dissolving 1,3-dinitro-2,2-dialkyl propane in a lower aliphatic alcohol, adding a quantity of a saturated lower fatty acid thereto slightly in excess of that required to combine with the quantity of diamine theoretically obtainable, mixing Raney nickel catalyst therewith and passing elemental hydrogen through the mixture at elevated temperature and pressure.

6. A process for preparing 2,2-dialkyl-1,3-propane diamines which comprises dissolving 1,3-dinitro-2,2-dialkyl propane in a lower aliphatic alcohol, adding thereto a quantity of a saturated lower fatty acid slightly in excess of that required to combine with the quantity of diamine theoretically obtainable, mixing Raney nickel catalyst therewith and passing elemental hydrogen through the mixture at temperatures between 35 and 50° C. and a hydrogen pressure between 500 and 2000 pounds per square inch.

7. A process for preparing 2,2-dialkyl-1,3-propane diamines which comprises subjecting a 1,3-dinitro-2,2-dialkyl propane to catalytic hydrogenation in the presence of a quantity of a saturated lower fatty acid in excess of an acid consisting of the amount required to combine with the quantity of diamine theoretically obtainable.

8. A process for preparing 2,2-dialkyl-1,3-propane diamines which comprises subjecting a 1,3-dinitro-2,2-dialkyl propane to catalytic hydrogenation in the presence of an acid consisting of acetic acid.

9. A process for preparing 2,2-dimethyl-1,3-propane diamine which comprises subjecting a 1,3-dinitro-2,2-dimethyl propane to catalytic hydrogenation in the presence of an acid consisting of a saturated lower fatty acid.

10. A process for preparing 2-ethyl-2-methyl-1,3-propanediamine which comprises subjecting a 1,3-dinitro-2-ethyl-2-methyl propane to catalytic hydrogenation in the presence of an acid consisting of a saturated lower fatty acid.

11. A process for preparing 2,2-di-n-propyl-1,3-propanediamine which comprises subjecting a 1,3-dinitro-2,2-di-n-propyl propane to catalytic hydrogenation in the presence of an acid consisting of a saturated lower fatty acid.

MURRAY SENKUS.

REFERENCES CITED

The following references are of record in the file of this patent:

UNITED STATES PATENTS

| Number | Name | Date |
|---|---|---|
| 2,157,391 | Vanderbilt | May 9, 1939 |

FOREIGN PATENTS

| Number | Country | Date |
|---|---|---|
| 571,794 | German | Mar. 15, 1933 |

OTHER REFERENCES

Vanderbilt et al., Ind. & Eng. Chem., vol. 32 (1940), pages 34–36. (Copy in Pat. Off. Lib.)

Certificate of Correction

Patent No. 2,418,237.

April 1, 1947.

MURRAY SENKUS

It is hereby certified that error appears in the printed specification of the above numbered patent requiring correction as follows: Column 5, lines 32 and 33, claim 7, strike out the words "an acid consisting of" and insert the same after "quantity of" in line 31, same claim; and that the said Letters Patent should be read with this correction therein that the same may conform to the record of the case in the Patent Office.

Signed and sealed this 5th day of August, A. D. 1947.

[SEAL]

LESLIE FRAZER,
First Assistant Commissioner of Patents.